(12) United States Patent
Nishijima et al.

(10) Patent No.: US 7,424,200 B2  
(45) Date of Patent: Sep. 9, 2008

(54) INFORMATION RECORDING APPARATUS AND INFORMATION RECORDING METHOD

(75) Inventors: Hideo Nishijima, Hitachinaka (JP); Hiroaki Ono, Mito (JP); Kouji Minabe, Hitachiohta (JP); Jun Ohya, Mito (JP)

(73) Assignee: Hitachi, Ltd., Tokyo (JP)

( * ) Notice: Subject to any disclaimer, the term of this patent is extended or adjusted under 35 U.S.C. 154(b) by 805 days.

(21) Appl. No.: 10/087,514

(22) Filed: Feb. 28, 2002

(65) Prior Publication Data

US 2003/0058352 A1   Mar. 27, 2003

(30) Foreign Application Priority Data

Sep. 25, 2001   (JP)   ............... 2001-290411

(51) Int. Cl.
  *H04N 5/91*   (2006.01)
(52) U.S. Cl. .............. 386/46; 386/117; 386/126
(58) Field of Classification Search ............... 386/46, 386/107, 117, 120; 396/429
  See application file for complete search history.

(56) References Cited

U.S. PATENT DOCUMENTS

| | | | |
|---|---|---|---|
| 5,077,612 A | | 12/1991 | Megrgardt et al. |
| 5,598,391 A | * | 1/1997 | Mukawa ............... 369/53.37 |
| 5,854,875 A | * | 12/1998 | Yamagishi .............. 386/120 |
| 5,943,519 A | * | 8/1999 | Aoki ..................... 396/429 |
| 6,744,465 B1 | * | 6/2004 | Tomikawa .............. 348/231.2 |
| 2003/0002413 A1 | * | 1/2003 | Marumori et al. ........ 369/53.18 |

FOREIGN PATENT DOCUMENTS

| | | |
|---|---|---|
| CN | 2314399 | 4/1999 |
| JP | 05-054518 A | 3/1993 |
| JP | 11-238310 | 8/1999 |
| JP | 11-317014 A | 11/1999 |
| JP | 2001-148166 | 5/2001 |
| JP | 2001-351314 A | 12/2001 |
| JP | 2001-351363 A | 12/2001 |
| JP | 2002-269746 A | 9/2002 |

OTHER PUBLICATIONS

U.S. Appl. No. 09/944,755, filed Aug. 31, 2001, Hiroyuki Marumori et al.

* cited by examiner

*Primary Examiner*—Huy T Nguyen  
(74) *Attorney, Agent, or Firm*—Townsend and Townsend and Crew LLP

(57) ABSTRACT

In an information recording apparatus, for conducting finalizing process on a removable recording medium with certainty, on which information is recorded in an easy format contained within a portable equipment in real-time manner, wherein the finalizing process is executed (steps 102, 103 and 104) when a predetermined amount of capacity remains in a battery 22, or when an external electric power source is connected to (20), depending upon a disc recording medium 32. Also, providing electric power saving (37) during time-period of this process and means (16) for inhibition of camera operation, for stoppage on a way and for re-recording, realizes the certain finalizing process. Further, a means is provided for conducting that process at high speed. Therefore, the finalizing process can be achieved with stability even in a portable equipment.

38 Claims, 11 Drawing Sheets

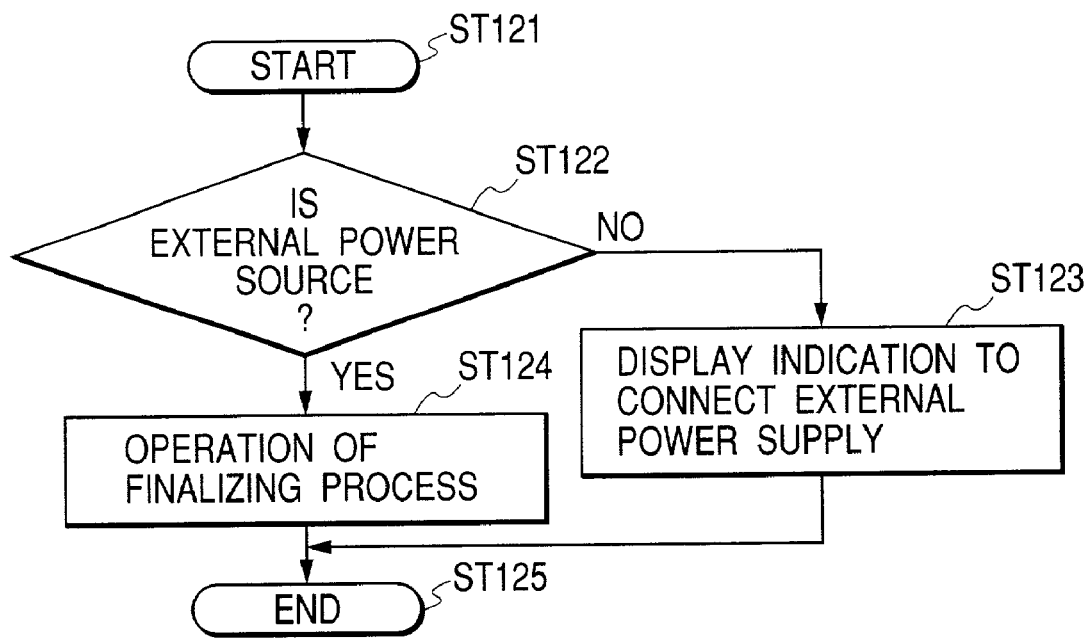
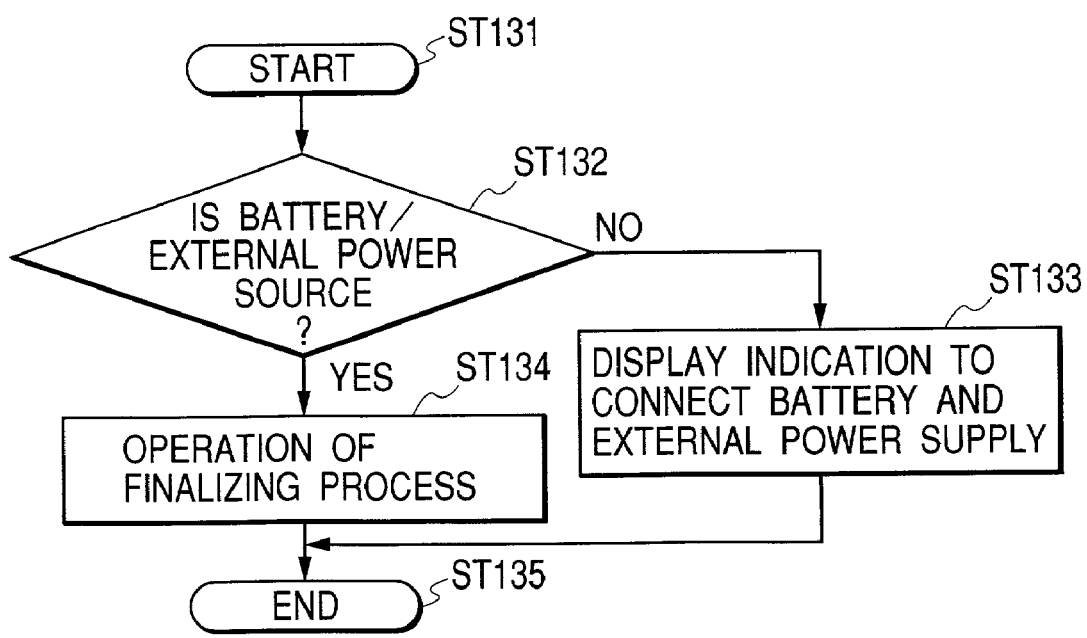

FIG. 17

| APPLICATION | DVD DISC TYPES | | | |
|---|---|---|---|---|
| | FOR EXCLUSIVE USE OF REPRODUCTION | RECORDABLE (WRITABLE) TYPE | | |
| | DVD-ROM | DVD-R FOR GENERAL | DVD-RW | DVD-RAM |
| VIDEO FORMAT | ○ | ○ | ○ | (○) |
| VIDEO RECORDING FORMAT | — | ○ | ○ | ○ |

INFORMATION RECORDING APPARATUS AND INFORMATION RECORDING METHOD

BACKGROUND OF THE INVENTION

The present invention relates to an information recording apparatus for a disc recording medium, such as a re-writable type recording disc and a write-once type disc, etc., on which the number of re-writing is restricted, and in particular, to an information recording method with using a finalizing process means thereon.

Conventionally, a real-time video recording format was already known, as an application, on which video can be recorded in real-time and it can be easily processed by compiling after the recording thereof, among methods for recording such the video information on a recording medium of disc-like shape. With this, TV program, etc., can be recorded thereon, simultaneously when it is broadcasted, and it is a standard, upon which compiling and/or erasing can be easily conducted on information after the video recording thereof.

On a while, the video format applied onto a software available on markets, which is assumed to be seen through a DVD (Digital Versatile Disc) video player available on markets, differs from the video recording format mentioned above, since the former is considered upon presumption that the information should be compiled in processing before the recording thereof. For this reason, the disc recorded in accordance with the video recording format mentioned above has a problem that it cannot be seen by means of such the DVD video player available on markets.

Then, a method is proposed of recording record management data according to the above-mentioned standard video format, again, wherein the information is once recorded, in real-time or simultaneously, in the form of an easy or plain format, to be treated with finalizing process, finally.

Further, such the apparatuses relating to the above are disclosed, for example, in Japanese Patent Laying-Open No. 2001-148166 and Japanese Patent Laying-Open No. Hei 11-238310 (1999), etc.

However, such the prior arts mentioned above never takes means of electric power supply, in particular, when the present disc recording apparatus is applied into a portable appliance or equipment into the consideration. For example, in the finalizing process on the discs, for example, a DVD-R (write-once type) and DVD-RW (re-writable type), etc., in a case when only a little amount of information is recorded on the recording disc, the empty or vacant area thereof must be recorded to a predetermined disc position by taking reproduction through the DVD video player into the consideration. This time takes several minutes or more, sometimes, then it may brings about a problem that the finalizing process cannot be completed with the capacity of a battery installed on such the portable equipment.

SUMMARY OF THE INVENTION

An object, according to the present invention, for dissolving the drawbacks of such the conventional arts, is to provide an information recording apparatus and an information recording method, wherein: confirmation can be made on a power source or supply of the disc recording apparatus, i.e., a battery has a sufficient remaining capacity for the finalizing process or not, and/or on a fact that other power supply is connected to the apparatus or not; the less electric power consumption can be obtained on the apparatus during this time-period; other operation will not be accepted during this time-period; and counter measures can be achieved when shortage occurs in the power supply in this time-period.

Also, other object according to the present invention is to provide an information recording apparatus and an information recording method, wherein a condition is displayed on the apparatus when staring the finalizing process, thereby indicating necessary information thereof to a user, clearly.

Also, further other object according to the present invention is to provide an information recording apparatus and an information recording method, wherein the time necessary for the finalizing process can be shorten.

And, moreover, further other object according to the present invention is to provide an apparatus, wherein the disc apparatus mentioned above is applied into a recording apparatus integrated with a camera in one body and/or into a portable-type information processing apparatus.

For accomplishing the object mentioned above, according to the present invention, there is provided an information recording apparatus, comprising: a first portable electric power source; a first detector circuit for detecting remaining capacity of said first electric power source; an external power source terminal of a second electric power source, being connected to an outside; a second detector circuit for detecting that the second electric power source is supplied to said external power source terminal; a recording circuit for recording information on a removable recording medium; and a finalizing process circuit for executing finalizing process for said recording medium, wherein when either one of the remaining capacity of said first electric power source and voltage of said second electric power source is detected to be equal or higher than a predetermined value, in said first detector circuit and said second detector circuit, operation of finalizing process is started by said finalizing process circuit upon said recording medium.

Also, according to the present invention, there is provided an information recording apparatus, comprising: a first portable electric power source; a first detector circuit for detecting remaining capacity of said first electric power source; an external power source terminal of a second electric power source, being connected to an outside; a second detector circuit for detecting that the second electric power source is supplied to said external power source terminal; a recording circuit for recording information on a removable recording medium; and a finalizing process circuit for executing finalizing process for said recording medium, wherein during finalizing process by said finalizing process circuit, when both of the remaining capacity of said first electric power source and voltage of said second electric power source are detected to be equal or lower than respective predetermined values thereof, in said first detector circuit and said second detector circuit, operation of the finalizing process by said finalizing process circuit is stopped upon said recording medium.

For accomplishing the object mentioned above, according to the present invention, there is provided an information recording apparatus, comprising: a recording circuit for recording information on a removable recording medium; and a finalizing process circuit for recording lead-out data at least up to a predetermined recording region as finalizing process upon said recording medium, wherein upon reproduction of said recording medium, if recording of the lead-out data of the finalizing process is started and is not completed up to the predetermined recording region, the lead-out data is newly recorded up to the predetermined region following the lead-out data recorded.

For accomplishing the object mentioned above, according to the present invention, there is provided an information recording apparatus, comprising: a lens unit for condensing optical signals; an image pickup circuit for obtaining electric signals from the optical signals obtained through said lens unit; an operation input circuit for changing picture information region obtained through said image pickup circuit by operating said lens unit; a recording circuit for recording video information from said image pickup circuit on a removable recording medium; and a finalizing process circuit for conducting finalizing process upon said recording medium, wherein during time-period of the finalizing process, no input is accepted to said operation input circuit.

For accomplishing the object mentioned above, according to the present invention, there is provided an information recording apparatus, comprising: an image pickup circuit for converting optical signals into electric signals; a digital compression converter circuit for converting an output from said image pickup circuit into a digital signal compressed; an exchanger circuit for exchanging at least one of electric power consumptions in said image pickup circuit and said digital compression converter circuit; a recording circuit for recording video information from said image pickup circuit onto said removable recording medium; a finalizing process circuit for conducting finalizing process upon said recording medium, wherein during time-period of the finalizing process by said finalizing process circuit, at least either one of electric power consumptions of said image pickup circuit and said digital compression converter circuit is reduced, at least by said exchanger circuit.

For accomplishing the object mentioned above, according to the present invention, there is provided an information recording apparatus, comprising: a portable electric power source; a detector circuit for detecting remaining capacity in said electric power source; a first display circuit for displaying a result detected by said detector circuit; a recording circuit for recording information on a removable recording medium; a finalizing process circuit for conducting finalizing process, in which necessary processing amount changes depending upon a region being already recorded on said recording medium; and a second display circuit for displaying a time necessary for the finalizing process by said finalizing process circuit.

For accomplishing the object mentioned above, according to the present invention, there is provided an information recording apparatus, comprising: a recording circuit for recording information on a removable recording medium; a display circuit for displaying at lest said information; a finalizing process circuit for conducting finalizing process on said recording medium; and an operation input circuit for operating an action of said finalizing process circuit, wherein under operation of said recording circuit, when substantially no recording area remains on said recording medium, whether said finalizing process should be conducted or not is displayed on said display circuit.

For accomplishing the object mentioned above, according to the present invention, there is provided an information recording apparatus, comprising: a image pickup circuit for converting optical signals into electric signals; a recording circuit for recording video information from said image pickup circuit on a removable recording medium; and a finalizing process circuit for conducting finalizing process on said recording medium, wherein upon recording operation from said image pickup circuit, the recording operation of at least of lead-out data by said finalizing process circuit is made faster in recording speed than that onto said recording medium.

For accomplishing the object mentioned above, according to the present invention, there is provided an information recording apparatus, comprising: a recording circuit for recording information on a removable recording medium; and a finalizing circuit for recording lead-out data at least up to a predetermined recording region as finalizing process for said recording medium, wherein recording of said read-out data is conducted intermittently by a unit of a predetermined amount thereof.

For accomplishing the object mentioned above, according to the present invention, there is provided an information recording method for finalizing process data of a recording medium, comprising the following steps: a first step for detecting remaining capacity in a first portable electric power source; a second step for detecting voltage of a second electric power source which is supplied at an external power source terminal; a third step for conducting finalizing process on a recording medium; and a fourth step for starting operation of said finalizing process upon said recording medium when at least either one of the remaining capacity of said first electric power source and the voltage of said second electric power source is equal or greater than a predetermined value.

For accomplishing the object mentioned above, according to the present invention, there is provided an information recording method of video data, comprising the following steps: a first step for detecting remaining capacity in a first portable electric power source; a second step for detecting voltage of a second electric power source which is supplied at an external power source terminal; a third step for recording information on a removable recording medium; a fourth step for conducting finalizing process on said recording medium; and a fifth step for stopping operation of said finalizing process when both the remaining capacity of said first electric power source and the voltage of said second electric power source are equal or less than respective predetermined values thereof, during the finalizing process.

For accomplishing the object mentioned above, according to the present invention, there is provided a method of restoration process for finalizing process, comprising the following steps: a first step for reproducing from a removable recording medium; a second step for detecting an end position of lead-out data; a third step for recording new lead-out data following said end position detected; and a fourth step for ending the recording when recording position reaches to a predetermined position.

For accomplishing the object mentioned above, according to the present invention, there is provided an information recording method, comprising the following steps: a first step for condensing optical signals by using a lens unit; a second step for converting the optical signals condensed into electric signals by an image pickup circuit; a third step for changing an area of video information condensed to said image pickup circuit by operating said lens unit; a fourth step for recording the electric signals onto said removable medium, as the video information; and a fifth step for conducting finalizing process on said recording medium, and at same time bringing said lens unit not to accept an action of operation thereof.

For accomplishing the object mentioned above, according to the present invention, there is provided an information recording method of digital signals, comprising the following steps: a first step for converting optical signals into electric signals by an image pickup circuit; a second step for converting said electric signals into digital signals being compressed in data thereof by a digital compression converter circuit; a third step for recoding said digital signals onto said removable recording medium; and a fourth step for conducting finalizing process on said recording medium, and at same time stopping at least one of the processes of said first step and said second step, thereby to reduce electric power consumption.

For accomplishing the object mentioned above, according to the present invention, there is provided an information recording method of video data, comprising the following steps: a first step for detecting remaining capacity in a portable electric power source; a second step for displaying result of said detection; a third step for recording information on a removable recording medium; a fourth step for conducting finalizing process, which changes necessary process amount depending upon region already recorded on said recording medium; and a fifth step for displaying time necessary for said finalizing process.

For accomplishing the object mentioned above, according to the present invention, there is provided an information recording method, comprising the following steps: a first step for recording information on a removable recording medium; a second step for detecting that substantially no recording area remains on said recording medium; a third step for displaying whether the finalizing process on said recording medium should be conducted or not when no recording area remains on said recording medium substantially.

For accomplishing the object mentioned above, according to the present invention, there is provided an information recording method, comprising the following steps: a first step for converting optical signals into electric signals by an image pickup circuit; a second step for recording said electric signals onto said removable recording medium; and a third step for recording data in the finalizing process, in which lead-out data is recorded at least up to a predetermined region on said recording medium, at speed being substantially higher than that in the recording operation of signals from said image pickup circuit.

For accomplishing the object mentioned above, according to the present invention, there is provided an information recording method, comprising the following steps: a first step for recoding information signals on a removable recording medium; and a second step for conducting finalizing process, in which lead-out data are recorded at least up to a predetermined recording region on said recording medium, intermittently, by a unit of a predetermined amount thereof.

For accomplishing the object mentioned above, according to the present invention, there is provided an information recording apparatus, comprising: a portable electric power source; a removable recording medium; a recording means for recording information on said recording medium; a finalizing process means for conducting finalizing process on said recording medium; and a detector means for detecting remaining capacity in said electric power source, wherein operation of said finalizing process means is practiced on said recording medium.

Also, according to the present invention, there is provided an information recording apparatus, comprising: a portable electric power source; a removable recording medium; a recording means for recording information on said recording medium; a finalizing process means for conducting finalizing process on said recording medium; means for displaying time necessary for the finalizing process by said finalizing process means depending upon recording area on said recording medium; a detector means for detecting remaining capacity in said electric power source; and a display means for displaying a result of said detector means.

Also, according to the present invention, there is provided an information recording apparatus, comprising: a first electric power source portable; an external power source terminal to be connected to a second electric power source, externally; a removable recording medium; a recording means for recording information on said recording medium; a finalizing process means for conducting finalizing process on said recording medium; and a detector means for detecting that said second electric power source is connected at said external power source terminal, wherein operation of said finalizing process means on said recording medium is practiced when said detector means detects that said second electric power source is supplied to.

Also, according to the present invention, there is provided an information recording apparatus, comprising: a first electric power source portable; an external power source terminal to be connected to a second electric power source, externally; a removable recording medium; a recording means for recording information on said recording medium; a finalizing process means for conducting finalizing process on said recording medium; and a detector means for detecting that said second electric power source is connected at said external power source terminal, wherein operation of said finalizing process means on said recording medium is not practiced when said detector means detects that said second electric power source is not supplied to.

Also, according to the present invention, there is provided an information recording apparatus, comprising: a first electric power source portable; an external power source terminal to be connected to a second electric power source, externally; a removable recording medium; a recording means for recording information on said recording medium; a finalizing process means for conducting finalizing process on said recording medium; a first detector means for detecting remaining capacity in said first electric power source; and a second detector means for detecting that a second electric power source is connected at said external power source terminal, wherein operation of said finalizing process means on said recording medium is practiced when both said first and second detector means detect that said first and second electric power sources are in condition being able to supply.

For accomplishing the object mentioned above, according to the present invention, there is provided an information recording apparatus, comprising: a lens unit means; an image pickup means for obtaining electric signals from optical signals obtained through said lens unit; an operation input means for changing video information obtained in said image pickup means by operating said lens unit means; a removable recording medium; a recording means for recording the video information from said image pickup means on said recording medium; and a finalizing process means for conducting finalizing process on said recording medium, wherein said operation input means will not accepted during time-period of the finalizing process.

For accomplishing the object mentioned above, according to the present invention, there is provided an information recording apparatus, comprising: an image pickup means; an exchanger means for exchanging electric power consumption in said image pickup means; a removable recording medium; a recording means for recording video information from said image pickup means on said recording medium; and a finalizing process means for conducting finalizing process on said recording medium, wherein electric power consumption in said image pickup means is reduced by said exchanger means at least during time-period of the finalizing process by said finalizing process means.

For accomplishing the object mentioned above, according to the present invention, there is provided an information recording apparatus, comprising: a portable electric power source; a removable recording medium; a recording means for recording information on said recording medium; a finalizing process means for conducting finalizing process on said recording medium; and a detector means for detecting remaining capacity of said electric power source, wherein during the finalizing process by said finalizing process means, operation by said finalizing process means on said recording medium is stopped when said electric power source comes down to be less than a predetermined remaining capacity.

Also, according to the present invention, there is provided an information recording apparatus, comprising: a first portable electric power source; an external power source terminal to be connected to a second electric power source, externally; a removable recording medium; a recording means for recording information on said recording medium; a finalizing process means for conducting finalizing process on said recording medium; a first detector means for detecting remaining capacity of said first electric power source; and a second detector means for detecting that said second electric power is not supplied at said external power source terminal, wherein during the finalizing process by said finalizing process means, operation of said finalizing process means on said recording medium is stopped, when either said first or second detector means detects that the electric power source of said first or second detector means comes down to be less than a predetermined value.

Further, according to the present invention, said finalizing process means comprises, at least: means for conducting recording in a lead-out; means for conducting recording in a recording management area; and means for conducting recording in a lead-in area, wherein stoppage of said finalizing process is conducted during the recording in said lead-out area.

Also, according to the present invention, there is provided an information recording apparatus, comprising: a removable recording medium; a recording means for recording information on said recording medium; and a finalizing process means for conducting finalizing process on said recording medium, wherein upon reproduction of said recording medium, lead-out data is newly recorded following the lead-out data recorded up to a predetermined region, when a lead-out area on which leas-out data are recorded does not reach to a predetermined region.

For accomplishing the object mentioned above, according to the present invention, there is provided an information recording apparatus, comprising: a first portable electric power source; an external power source terminal to be connected to a second electric power source, externally; a removable recording medium; a recording means for recording information on said recording medium; a display means for displaying at least said information; a finalizing process means for conducting finalizing process on said recording medium; an operation input means for operating an action of said finalizing process means; and a detector means for detecting that said second electric power source is supplied to said external power source terminal, wherein the operation of said finalizing process is indicated by said operation input means, and also an indication is displayed on said display means, so as to bring the second electric power source to be connected to said external power source terminal, when said detector means detects that said second electric power source is not supplied to.

Also, according to the present invention, there is provided an information recording apparatus, comprising: a removable recording medium; a recording means for recording information on said recording medium; a display means for displaying at least said information; a finalizing process means for conducting finalizing process on said recording medium; and an operation input means for operating an action of said finalizing process, wherein an amount of information recording on said recording medium or a remaining amount of unrecorded portion on said recording medium is displayed on said display means, when operation of the finalizing process is instructed by said operation input means.

Also, according to the present invention, there is provided an information recording apparatus, comprising: a removable recording medium; a recording means for recording information on said recording medium; a display means for displaying at least said information; a finalizing process means for conducting finalizing process on said recording medium; and an operation input means for operating an action of said finalizing process, wherein on said display means is displayed whether said finalizing process should be conducted or not, when said recording medium is taken out from said apparatus.

Also, according to the present invention, there is provided an information recording apparatus, comprising: a removable recording medium; a recording means for recording information on said recording medium; a display means for displaying at least said information; a finalizing process means for conducting finalizing process on said recording medium; an operation input means for operating an action of said finalizing process; and a recording medium remaining capacity detector means for detecting an amount of information recorded on said recording medium or remaining capacity of unrecorded portion on said recording medium, wherein, when said recording medium is taken out from said apparatus, a display is made on said display means of whether said finalizing process should be conducted or not, if the amount remaining on said recording medium is less than a predetermined value.

Also, according to the present invention, there is provided an information recording apparatus, comprising: a removable recording medium; a recording means for recording information on said recording medium; a first operation input means for operating start and end of an action of said recording means; a display for displaying at least said information; a finalizing process means for conducting finalizing process on said recording medium; and a second operation input means for operating an action of said finalizing process, wherein a display is made of whether said finalizing process should be conducted or not on said display means when recording on said recording medium is completed by said first operation input means.

Also, according to the present invention, there is provided an information recording apparatus, comprising: a removable recording medium; a recording means for recording information on said recording medium; a display means for displaying at least said information; a finalizing process means for conducting finalizing process on said recording medium; an operation input means for operating an action of said finalizing process; and a recording medium remaining capacity detector means for detecting an amount of information recorded on said recording medium or remaining capacity of unrecorded portion on said recording medium, wherein, upon operation of said recording means, a display is made of whether said finalizing process should be conducted or not on said display means, when no recording region remains on said recording medium.

For accomplishing the object mentioned above, according to the present invention, there is provided an information recording apparatus, comprising: a lens unit means; an image pickup means for obtaining electric signals from optical signals obtained through said lens unit; a removable recording medium; a recording means for recording video information from said image pickup means on said recording medium; and a finalizing process means for conducting finalizing process on said recording medium, wherein recording is conducted intermittently when said recording means operates, thereby conducting at least recording of lead-out data continuously by said finalizing process means.

Also, according to the present invention, there is provided an information recording apparatus, comprising: a lens unit means; an image pickup means for obtaining electric signals from optical signals obtained through said lens unit; a removable recording medium; a recording means for recording video information from said image pickup means on said recording medium; and a finalizing process means for conducting finalizing process on said recording medium, wherein at least recording operation of lead-out data by said finalizing process means is faster than the operation of said recording means, in recording data speed upon said recording medium.

Further, according to the present invention, a disc recording apparatus, in which the finalizing process circuit of said information recording apparatus is provided, is applied to a recording apparatus integrated with a camera in one body.

Further, according to the present invention, a disc recording apparatus, in which the finalizing process circuit of said information recording apparatus is provided, is applied to a portable type information processing apparatus.

As was apparent from the mentioned above, according to the present invention, an information recording apparatus, being provided with: means for ascertaining that the electric power source of the disc recording apparatus remains battery capacity enough to the finalizing process, or other electric power source is supplied with; means for obtaining electric power saving of the apparatus during this time-period; means for accepting no other operation during this time-period; and means for ending the process when shortage occurs in the electric power supply in this time-period, can brings about an effect that the finalizing process can be achieved with certainty.

Also, according to the present invention, with provision of the display means for displaying the condition of apparatus when it starts the finalizing process, therefore it brings about an effect of providing a material necessary for the user to decide.

Also, with provision of means for shortening the time of finalizing process, therefore it brings about an effect that the processing time thereof can be shortened.

Furthermore, applying the recording/reproducing apparatus into a recording apparatus integrated with a camera in one body and/or a portable type information processing apparatus brings about an effect of obtaining an improvement on operability for the portable equipment, as well as, compatible reproducing capacity with other apparatuses on the removable discs.

BRIEF DESCRIPTION OF THE DRAWINGS

Those and other features, objects and advantages of the present invention will become more apparent from the following description when taken in conjunction with the accompanying drawings wherein:

FIG. 5 shows other operation flowchart in the main portion in the embodiment according to the present invention;

FIG. 6 shows further other operation flowchart in the main portion in the embodiment according to the present invention;

FIG. 17 is a view for showing a relationship between disc media and the recording formats thereof.

DETAILED DESCRIPTION OF PREFERRED EMBODIMENTS

Figure 1:
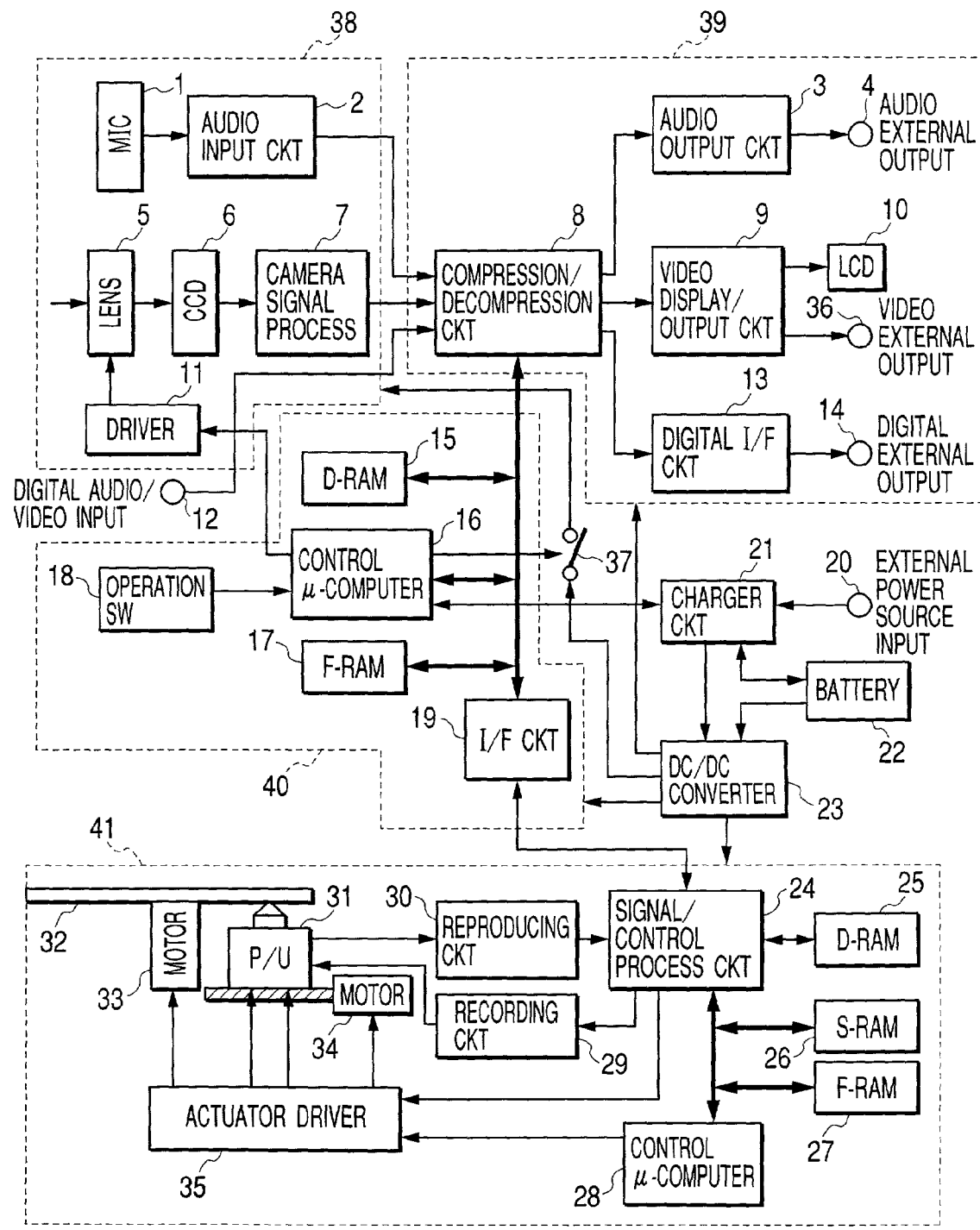
FIG. 1 shows a circuit block diagram of one embodiment according to the present invention.

Hereinafter, embodiments according to the present invention will be fully explained by referring to the attached FIGS. 1 through 3. FIG. 1 shows a recording and/or reproducing apparatus of a type integrated with a camera in one body, using a disc-like recording medium therein. In this FIG. 1, a reference numeral 1 depicts a microphone; 2 an audio input processing circuit; 3 an audio output circuit; 4 an audio external output terminal; 5 a lens unit; 6 an image pickup sensor (e.g., a CCD); 7 a camera video signal processing circuit; 8 a compress/decompress processing circuit of audio/video signals; 9 a video display/output processing circuit; 10 a display unit (e.g., a LCD); 11 a driver of the lens unit 5; 12 a digital audio/video input terminal; 13 a digital interface processing circuit; 14 a digital external output terminal; 15 a D-RAM; 16 a control micro-computer for the apparatus as a whole (i.e., a system control unit); 17 a flash memory (F-RAM); 18 an operation switch (SW); 19 an interface circuit; 20 an input terminal of an external electric power source; 21 a charger circuit; 22 a battery; 23 an electric power source circuit (e.g., a DC-DC converter); 24 a signal/control processing circuit of the disc medium; 25 a D-RAM; 26 a S-RAM; 27 a flash memory (F-RAM); 28 a control micro-computer of the recording/reproducing portion; 29 a recording circuit; 30 a reproducing circuit; 31 a pickup for conducting recording/reproduction on/from the medium; 32 a disc medium; 33 a spindle motor; 34 a sending motor for moving the pickup 31 above the disc medium; 35 an actuator driver for driving the sending motor 34 and actuators (not shown in the figure) in a focus direction and a tracking direction within the pickup 31 respectively; 36 a video external output terminal; 37 a switch circuit; 38 a camera portion; 39 an output portion; 40 a controller portion; and 41 a recording/reproducing portion, respectively.

Herein, explanation will be given on the camera portion 38. Video information is converted through the lens unit 5 driven by the driver 11 into electric signals in the image pickup sensor 6, and then is converted into video signals in the camera video signal processing circuit 7. On a while, audio is converted through the microphone 1 into audio signals in the audio input processing circuit 2.

Next, explanation will be made on the operation of the output portion 39. Those signals mentioned above are converted into digital video/audio compression signals in the compression/decompression circuit 8 for the video/audio. As a compression method may be practiced the MPEG method dealing with the moving picture or the JPEG method for dealing with the still picture. Also, it is possible to change over the input information from an outside to be used, by the means of the digital audio/video input terminal 12. As an output means, the audio signals from the compression/decompression circuit 8 for the video/audio are outputted through the audio output circuit 3 to the audio output terminal 4. Also, the video signals are displayed through the video display/output processing circuit 9 on the display unit 10, and at the same time, are outputted from the video output terminal 36. Further, through the digital interface processing circuit 13, the digital video/audio signals are outputted from the digital output terminal 14. Herein, the explanation was given on the input signals and the output signals outputted through the compression/decompression processing circuit 8, however it is needless to say that those output signals, thus, both the audio signals and the video signals should not be treated with the compression/decompression process thereupon.

Next, explanation will be made on the controller portion 40. The present apparatus starts an operation thereof, through an operation by a user on the operation switch 18. An output of the operation switch 18 is inputted into the control micro-computer 16 for the entire of the apparatus. The control micro-computer 16 controls the lens unit 5 through the driver 11, thereby catching an object on the image pickup sensor 6 as a video at her/his wish.

Also, in the compression/decompression circuit 8 for the video/audio, the moving picture and the still picture are controlled to be compressed into digital signals, so as to be memorized in the D-RAM 15, contemporarily. Those signals are sent through the interface circuit 19 to the signal/control processing circuit 24 of a disc-type recording/reproducing apparatus.

To this interface circuit may applied, for example, the ATAPI regulation, etc. Also, it grasps the condition of the power source by watching over the charger circuit 21, or conducts a power source processing upon the camera portion by controlling the switch circuit 37. Also, the flash memory 17 is a memory, in which a program or the like is stored, for operating the control micro-computer 16. The D-RAM 15 is a memory for memorizing the processed data of the compression/decompression circuit 8 for the video/audio and the processed data of the control micro-computer 16 therein, contemporarily.

Finally, explanation will be given on the operation of the recording/reproducing portion 41. The recording/reproducing portion 41 converts the moving picture or the still picture information, which are inputted from the interface circuit 19, into the recording format corresponding to the disc media, in the signal/control processing circuit 24 and the D-RAM, and records it on the disc medium 32 through the recording circuit 29 and the pickup 31 thereof. Also, the relative position between the disc medium 32 and the pickup 31 is detected through the reproduction circuit 30 from the position information which is written on the disc medium 32 in advance, by making the pickup 31 reproducing operation in time-sharing, and is processed in the signal/control processing circuit 24 and the control micro-computer 28, thereby driving each of the actuators, i.e., the spindle motor 33 and the sending motor 34, and also an actuator located within the pickup, but not shown in the figure, for controlling the focus and the tracking. By the way, the S-RAM 26 and the flash memory 27 are used for contemporary memorizing the calculation data and memorizing of the program of the control micro-computer 28, etc.

Also, the present apparatus supplies electricity to each part necessary thereof from an electric power source of the battery 22 full, which is charged up by electric power supplied from the external power source input terminal 20 or that power source, with utilizing the charger circuit 21 fully.

In the above, though the explanation was given on the recording operation, however the apparatus will conduct the operation in a manner almost reverse to that mentioned above, when reproducing. Namely, the information on the disc medium 32 is detected through the pickup 31 and the reproduction circuit 30, and it is demodulated from the recording format corresponding to the disc medium through the signal/control processing circuit 24 and the control micro-computer 28. And, it is turned back to the compression/decompression circuit 8 for the video/audio. In this compression/decompression circuit 8 for the video/audio, the compressed video and audio signals are decompressed or expanded, and they are outputted through the video display/output processing circuit 9 and the audio output circuit 3 to the display unit 10, and also the audio external output terminal 4 and the video external output terminal 36. Also, the information before the decompression or expansion thereof is outputted through the digital interface processing circuit 13 to the digital external output terminal 14.

Further, the power source portion has the external power source input terminal 20, thereby enabling electric power supply from an outside. Also, the battery 22 is charged up by the electric power source supplied from this external power source input terminal 20 through the charger circuit 21. With this, the electricity is supplied to each of blocks through the power source circuit 23 when the electric power is supplied from an outside, while the electricity from the battery 22 is supplied to each of blocks through the power source circuit 23 when no external power supply or source is connected thereto.

Herein, the disc media 32 for treating the video signals thereon includes those, as shown in FIG. 17: thus, the DVD-ROM for exclusive use of reproduction; the DVD-R as a type, on which recording can be made by only one-time; and the DVD-RW as a medium, on which recording or writing can be made freely. And, as the recording format thereof are proposed, such as, the "DVD Video format" and the "Video recording format", for example.

The "DVD Video format" contains an enhanced information data for realizing it's original and unique functions, such as, the multi-angle and/or parental reproduction, the random/shuffle reproduction, etc., of the video information, such as, movies, etc., which are fully compiled and processed in advance, and also for supporting the special reproductions of, such as, the fast sending, the re-winding, etc.

Also, the "Video recording format" is made up by taking an application into the considerations, on which video signal can be recorded simultaneously or in real-time without passing through the compiling process, and it can be compiled easily after recording thereof, upon presumption of such the discs of re-writable type. However, the signal recorded in the "Video recording format" has a drawback that, many times, it cannot be reproduced by the almost of the DVD video players for reproducing the disc for exclusive use of reproduction which is recorded in the "DVD Video format" mentioned above.

Such the drawback can be dissolved, in particular, when recording on the disc medium in the video camera, on the disc of re-writable type, such as the DVD-RW or the DVD-RAM, by re-recording the signal converted again into the "DVD Video format" through the compiling operation, after recording it once in the "Video recording format", however since the signal cannot be rewritten again if being recorded once in the "Video recording format" on the DVD-R disc, as the disc type, on which recording can be made by only one-time, and therefore, the disc cannot be reproduced by the many of the DVD video players.

Then, for the DVD-R disc, a method is applied, in which the information is recorded once in the form of a simple or easy format in real-time and is finally conducted by a finalizing process thereupon, and thereby re-recoding the recording management data in accordance with the standard "DVD Video format" mentioned above. Hereinafter, explanation will be made on an example of the DVD-R disc, however it is needless to say that the same or similar processing can be applied on the DVD-RW and the DVD-RAM, too.

Figure 2:
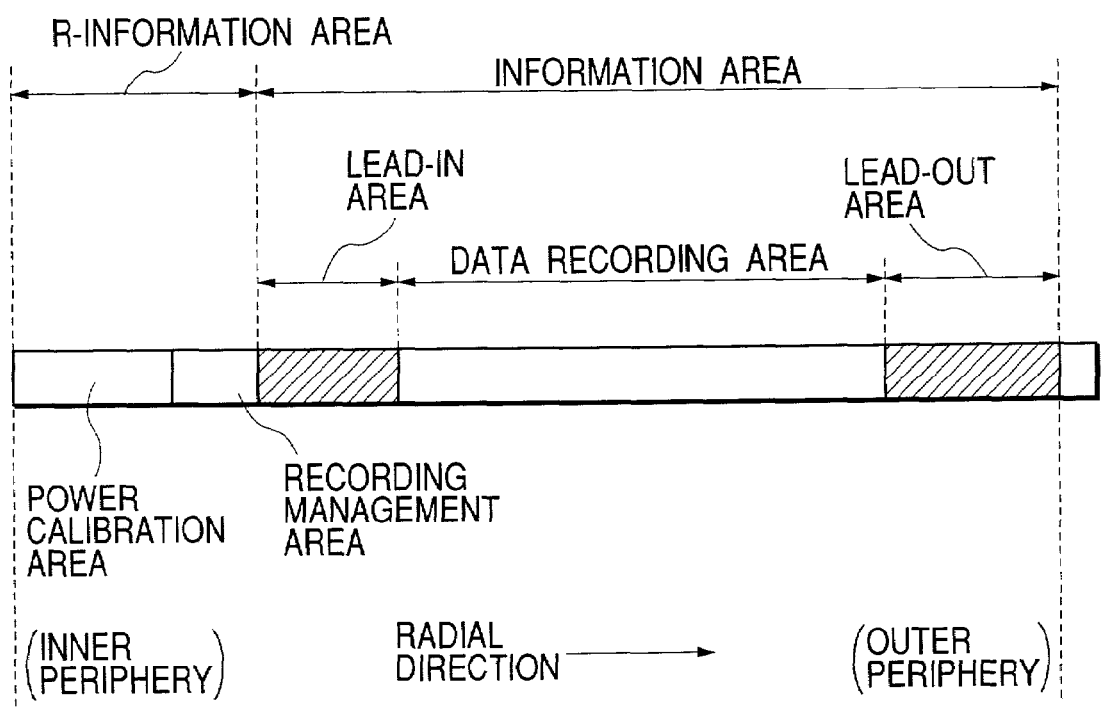
FIG. 2 shows typical pattern of data structure on a disc used in the embodiment according to the present invention.
Figure 3:
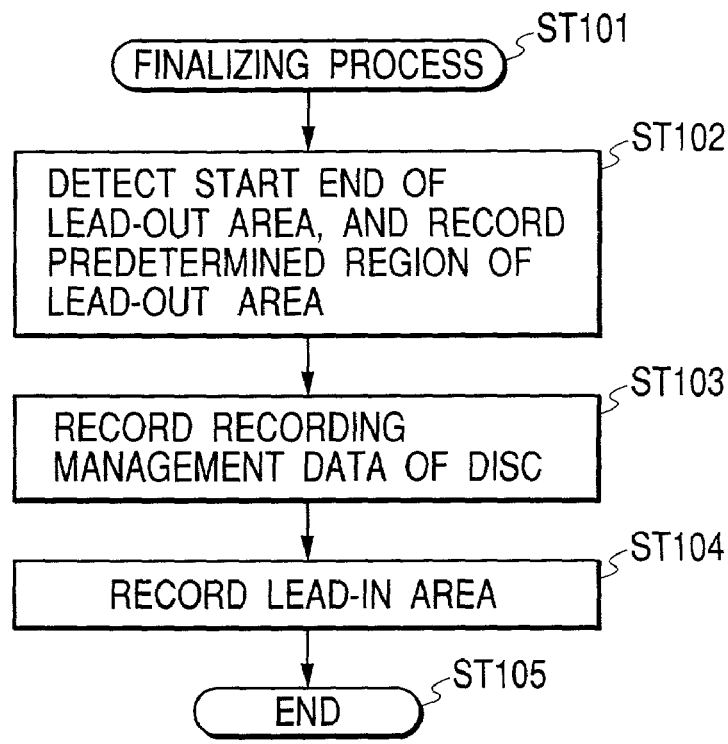
FIG. 3 shows an operation flowchart in a main portion in the embodiment according to the present invention.

FIG. 2 shows the data structure of the DVD disc, diagrammatically. On the DVD, on which recording and reproducing can be made, a management area is made up with a R-Information Area, a Lead-in Area and a border-out/Lead-out Area (hereinafter, being called by "Lead-out Area"), and further the R-Information is built up with a Power Calibration Area and a Recording Management Area, however compatibility in the reproduction is ensured by making the contents of the Lead-in Area and the Lead-out Area equal to those of the DVD-ROM for exclusive use of reproduction.

And, every time when the processing accompanying recording therewith, such as, in particular when data is newly recorded into the data recording area, and/or when the data recorded in the data recording area is compiled, etc., the management of recording condition is conducted by re-writing predetermined recording management data into this management area.

In FIG. 2, on the present disc, groove and land are formed spirally around a cramping area (CA), and on the groove and the land are formed wobble and land pre-pit, respectively.

Upon the basis of information of the wobble and the land pre-pit, the picking up of the information recording/reproducing apparatus is controlled to align with the wobble, thereby conducting the recording of information (i.e., write-in of data) and the reproducing of information (i.e., read-out of data), as well.

To the groove, on/from which the write-in of data or the read-out of data is conducted, are assigned R-Information Area (RIA) and Information Area (IA), in the directing from an inside (i.e., the side of the cramping area (CA)) to an outside.

The R-Information Area (RIA) is built up with the Power Calibration Area (PCA) and the Recording Management Area (RMA), and the Information Area (IA) with Lead-in Area (LIA) and Data Recording Area (DRA: or, user data area).

Next, explanation will be made on the operation of finalizing process.

In the same figure, when the user operates the operation switch 18, operation of the finalizing process starts. First, in the step 102, the last end of main data that was already recorded within the data recording area (e.g., user data area), i.e., an address of the start end of Lead-out Area (LOA) is detected. Further, the Lead-out Area (LOA) of a predetermined region in the standard format is recorded.

Next, in the step 103, the recording management data (DCW) is recorded in the recording management area (RMA).

Next, in the step 104, the recording management data (DCW) is recorded in a predetermined area of the Lead-in Area (LIA) in accordance with the standard format, as a predetermined data for indicating of being already finalized.

In this manner, when the finalizing process is conducted, the recording management data (DCM) is automatically recorded in accordance with the standard format if the disc 32 loaded is in the easy format, therefore the compatibility can be ensured with the DVD for exclusive use of read-out.

However, the finalizing process records the Lead-out Area (LOA) up to the predetermined region (for example, 70 mm in diameter) when the recorded area is small, as was mentioned above. For this, it can be considered that the finalizing process takes time of several tens minutes depending upon the conditions.

Figure 4:
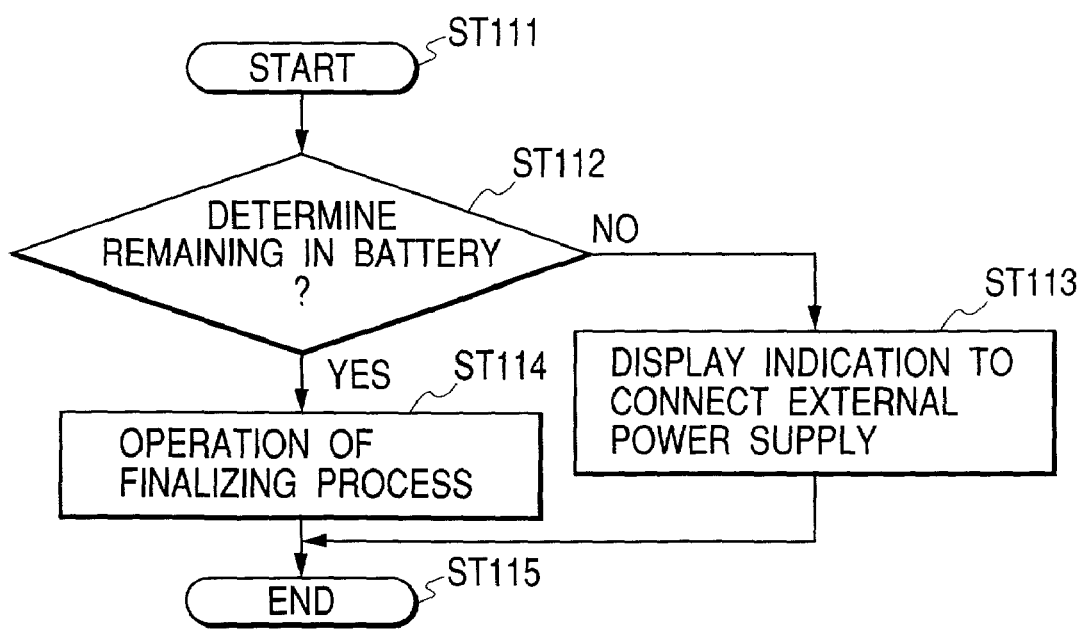
FIG. 4 shows an operation flowchart in other main portion in the embodiment according to the present invention.

Herein, an embodiment showing one of the features according to the present invention will be explained by referring to FIG. 4. In the present apparatus, when it starts the finalizing process, as is shown in FIG. 4, first the remaining capacity of the battery 22 is determined in the step 112. If determining that the battery 22 has sufficient remaining capacity for the finalizing process herein, then in the step 114, the finalizing process is carried out, however if determining not, i.e., being insufficient for carrying out the finalizing process therewith, then in the step 113, this fact is display on the display means 10, so as to inform the user of necessity of connecting to an external electric power source. For determination on the remaining capacity, normally, a voltage value at a battery terminal is used, for example. Namely, the remaining capacity can be determined by using the fact that the voltage comes down gradually when the remaining capacity comes down to zero or runs short. Of course, it may be possible to user other methods, in the place thereof.

Also, explanation will be made on other embodiment by referring to FIG. 5. In the present apparatus, when starting the finalizing process upon the operation of the operation switch 18, as is shown in FIG. 5, first it is determined whether the external electric power source is connected to or not, in the step 122. This determination is made by the control micro-computer 16 given with a result of detection from the charger circuit 21, which can detect that the external electric power source is connected to the external power source input terminal 20. The finalizing process is carried out in the step 124, if the external electric power source is connected to, however if not (i.e., the external electric power source is not connected), this fact is display on the display means 10, so as to inform the user of necessity of connecting to an external electric power source, in the step 123.

Also, explanation will be made on further other embodiment by referring to FIG. 6. In the present apparatus, when starting the finalizing process upon the operation of the operation switch 18, as is shown in FIG. 6, first it is determined whether the battery and the external electric power source are connected to or not, in the step 132. This determination is made by the control micro-computer 16 given with a result of detection from the charger circuit 21, which can detect that the external electric power source is connected to the battery 22 and to the external power source input terminal 20. The finalizing process is carried out in the step 134, if the battery and the external electric power source are connected to, however if not (i.e., the battery and the external electric power source is not connected), this fact is display on the display means 10, so as to inform the user of necessity of connecting to the battery and the external electric power source, in the step 133.

In the present embodiment, the finalizing process is carried out only when electricity is supplied to the apparatus from both the battery and the external electric power source, thus, the finalizing process will not conducted only one electric power source, thereby obtaining an advantage that the process can be carried out more safely even if the one electric power source shuts off the electricity by any reason.

Figure 7:
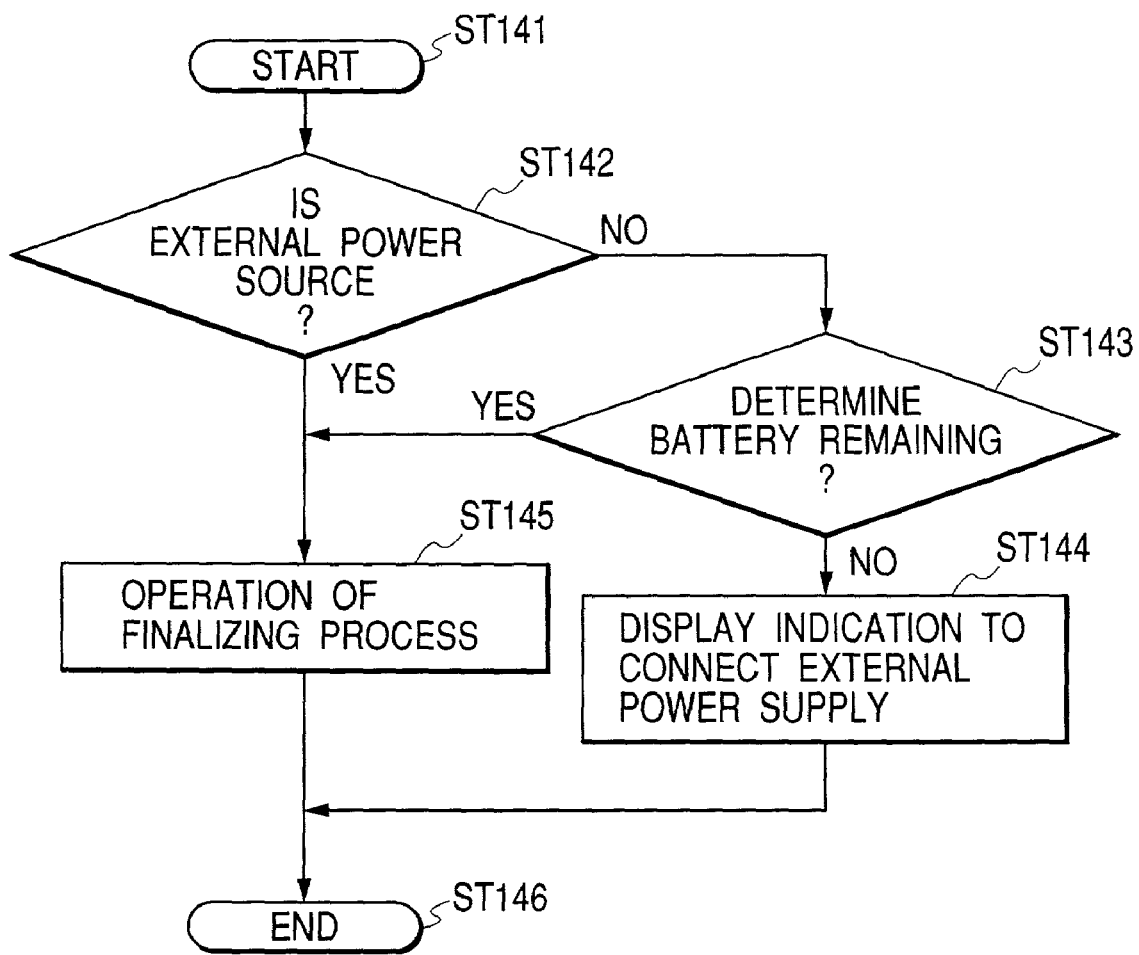
FIG. 7 shows further other operation flowchart in the main portion in the embodiment according to the present invention.

Also, explanation will be made on further other embodiment by referring to FIG. 7. In the present apparatus, when starting the finalizing process upon the operation of the operation switch 18, as is shown in FIG. 7, first it is determined whether the external electric power source is connected to or not, in the step 142. The finalizing process is carried out in the step 145, if the external electric power source is connected to. On a while, if not (i.e., the external electric power source is not connected), the remaining capacity of the battery 22 is determined in the step 143. Herein, if determining the capacity remains, the finalizing process is carried out in the step 145. However, if determining no capacity remains, then this fact is display on the display means 10, so as to inform the user of necessity of connecting to the battery and the external electric power source, in the step 144.

Figure 8:
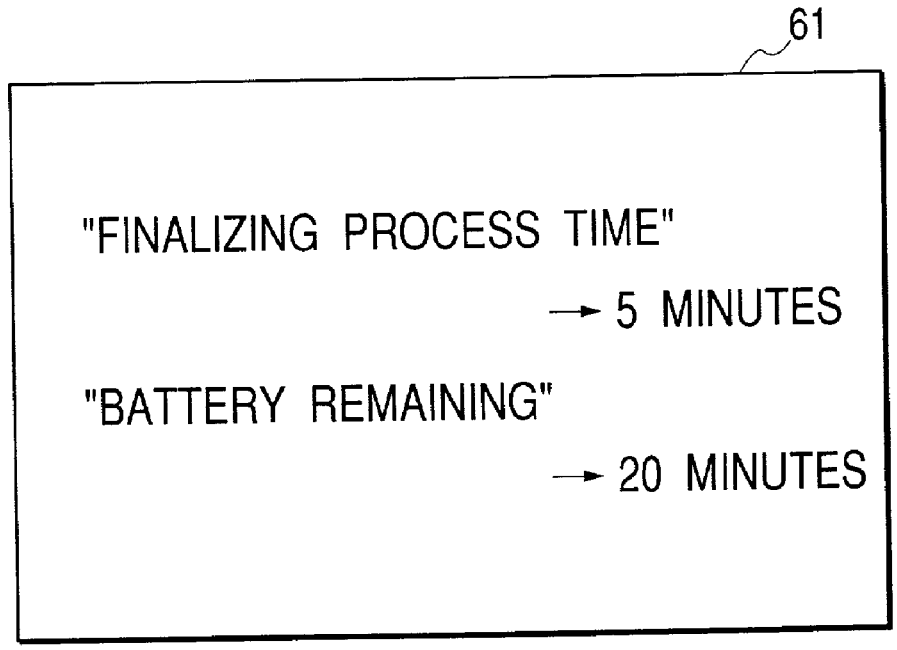
FIG. 8 is a view for showing an example of display, in more details thereof, in a part of the embodiment according to the present invention.
Figure 9:
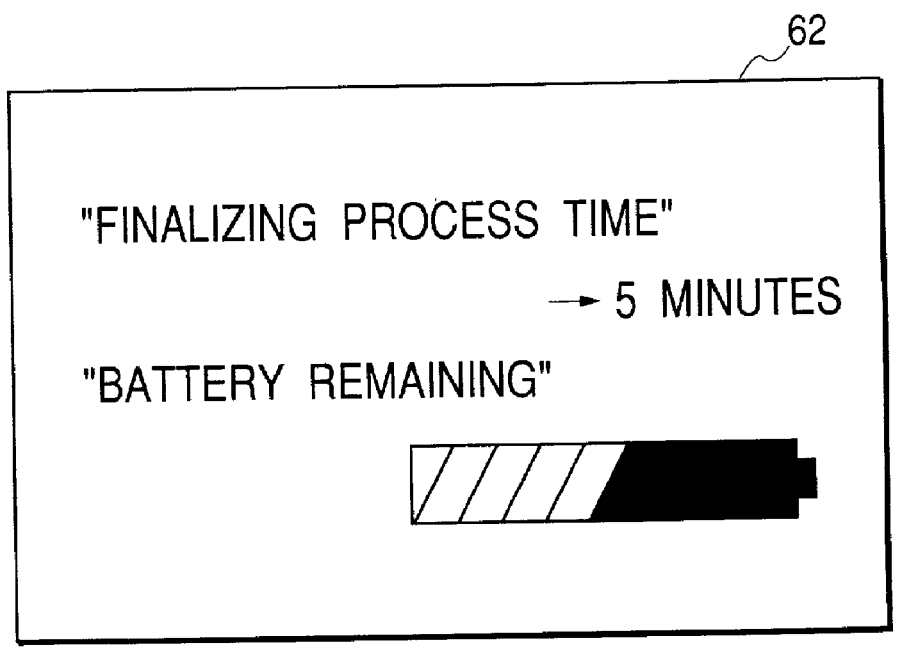
FIG. 9 is a view for showing other example of display, in more details thereof, in a part of the embodiment according to the present invention.

Examples of the displays of, i.e., a finalizing process time and a remaining time in capacity of the battery 22, are shown in FIGS. 8 and 9, which are displayed in advance when the finalizing process is started by the electric power supply of the battery 22 in the FIGS. 4, 6 and 7, etc. FIG. 8 shows the time necessary for the finalizing process and the remaining time on the battery capacity, thereby allowing the user to determine whether still an enough margin remain in the battery capacity or not. At this time, it is also displayed that the finalizing process is under processing, thereby obtaining an effect of displaying the remaining time up to the completion of the process. Also, FIG. 9 shows other example of the display. It shows an example of displaying the remaining capacity of battery in the form of an image, in the case where it is impossible to display the remaining time of battery capacity, in quantity.

Next, other feature of the present invention will be explained by referring to the FIG. 1. During the finalizing process mentioned above, it may be considered that no other new operation should be accepted, in particular, even from a viewpoint of using the remaining capacity of the battery effectively. For example, the control signal is inhibited to be provided from the control micro-computer 16 to the driver 11 for driving the lens unit 5 of the camera portion 38. Ordinarily, this lens unit 5 is controlled from the operation switch 18 through the driver 11, such as, by the operations, tele/wide, etc., however when the above-mentioned finalizing process is started by the control micro-computer 16, such as the operations, tele/wide, etc., mentioned above, are inhibited until when this process is completed or ended. With this, it is possible to achieve an effect that the electric power consumption in the camera portion can be suppressed not to rise up during the time-period of the finalizing process.

Also, from the similar viewpoint, during the time-period of the finalizing process mentioned above, the entire or a part of the camera portion is brought into a condition being supplied with no electricity from the power source, aggressively. This can be realized by changing over the switch circuit 37 through the control micro-computer 16.

Next, further other embodiment according to the present invention will be explained by referring to FIGS. 1 to 10.

After starting the finalizing process, there can be considered various reasons in conditions, so that the process must be shut out or stopped on the way thereof. For example, such the reasons can be considered: i.e., the finalizing process is started erroneously; the user changes her/his mind to the camera recording just after thereon; or the supply of electricity is stopped, etc. A process for such the cases will be explained in FIG. 10. After detecting the start end of the lead-out data recording in the step 152, the data of the lead-out area is recorded by a unit of a predetermined amount thereof in the step 153. And, every time when the recording by the unit of predetermined amount is completed, for example, the remaining capacity of battery is detected in the step 154, to be determined. Herein, if determining that the predetermined amount of capacity remains therein (i.e., the voltage value being equal or greater than a predetermined value), then in the step 155, it is determined whether the lead-out area recorded reaches up to the predetermined area or not. If not reaching to, the process turns back to the above-mentioned step 153, again, so as to re-start the recording by the unit of predetermined amount following after the data of the lead-out area, which was already recorded. If the recording of the lead-out data in the predetermined lead-out area is completed in the step 155, the record management data of the disc is recorded in the step 156, and the lead-in area is recorded in the step 157.

Herein, the disc management data and the lead-in area are regions or areas those are predetermined in advance, and the recording time is several tens seconds, being fully short comparing to that of the lead-out area.

If determining no battery capacity remains (i.e., the voltage value being less than the predetermined value) in the step 154, the process jumps to the step 158, thereby shutting out the finalizing process to the end.

Figure 10:
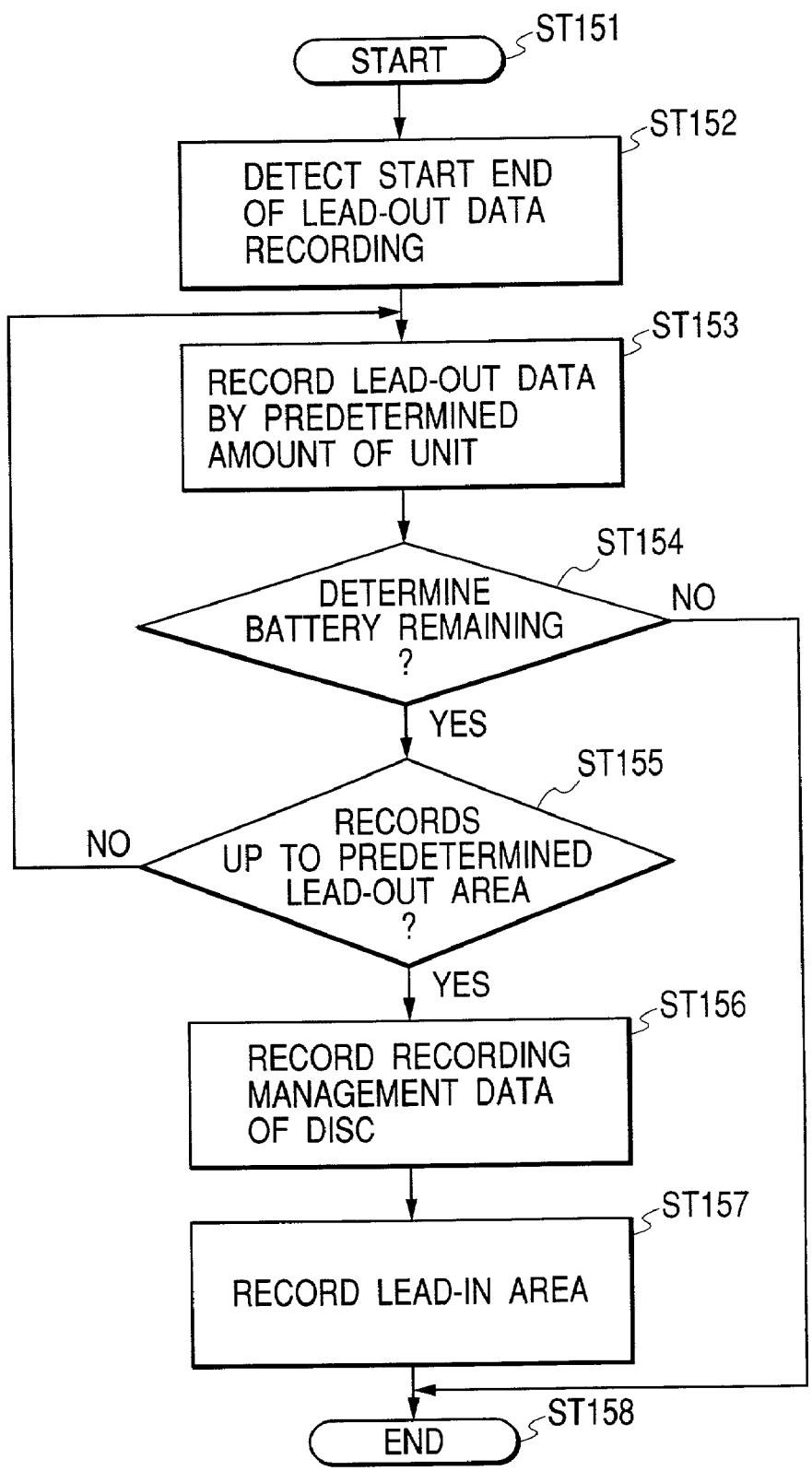
FIG. 10 shows further other operation flowchart in the main portion in the embodiment according to the present invention.

In FIG. 10, the remaining capacity of battery is determined in the step 154, however this step may be replace by determination on whether the external power source is connected or not in the FIG. 6. Also, in the present apparatus, applying the process, i.e., determining whether the user inputs an interruption command of the finalizing process or not by using the operation switch 18, into the step 154, may also brings about the similar effect to the above.

Next, explanation will be given on a method for practicing the finalizing process, again, on the disc 32 that is interrupted under such the condition as will be mentioned below. In the present apparatus, when the finalizing process is started by the operation on of the operation switch 18, as shown in FIG. 10, the start end of recording of the lead-out data is detected in the step 152. In this step 152, also the last position of the lead-out data, being already recorded in the lead-out area, is detected on the disc 32, which is interrupted on the way of the finalizing process, and following to the above, the lead-out data is newly started to be recorded, thereby it is possible to complete the finalizing process.

Figure 11:
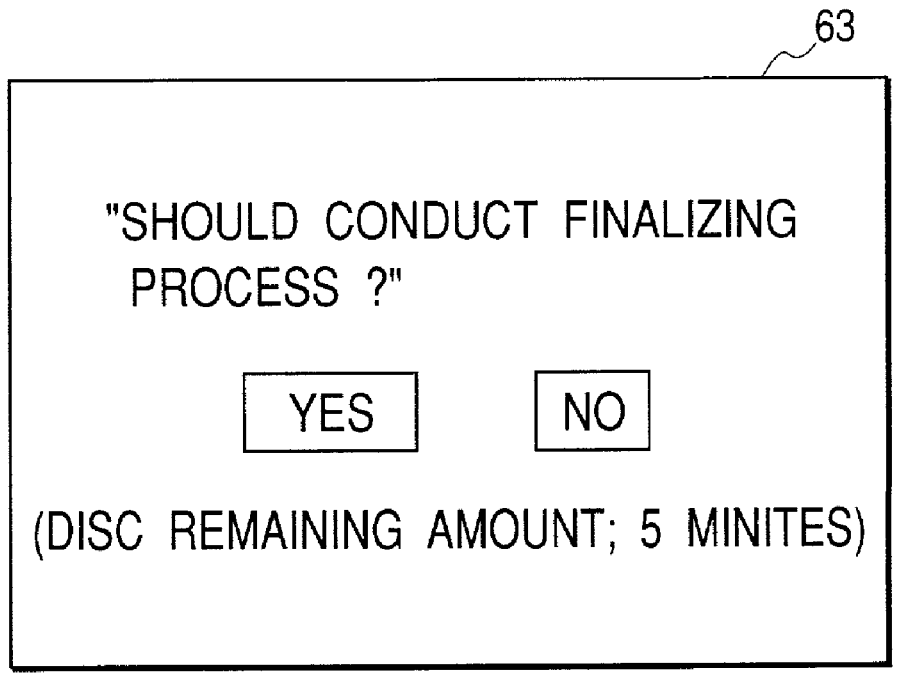
FIG. 11 is a view for showing an example of display, in more details thereof, in other part of the embodiment according to the present invention.

Next, explanation will be given on an embodiment relating to a chance or opportunity of conducting the finalizing process, by referring to FIG. 1, and FIGS. 11 through 13, as well. A command is given from the operation switch 18 to the present apparatus when the user executes the finalizing process, however upon the opportunity of this, for example, the operation may be made for taking out the disc 32 from the present apparatus may, sometimes. Namely, when operation is made from the operation switch 18 to an eject button (the details thereof is not shown) for taking out the disc 32, the display shown in FIG. 11 is displayed on the display unit 10, by means of the step 162 shown in FIG. 12, thereby letting the user to select whether the finalizing process should be executed or not. In this instance, the recorded or used capacity (or time, etc.) on the disc 32 and the remaining capacity (or time, etc.) thereof are displayed, thereby providing a material for determination by the user.

Figure 13:
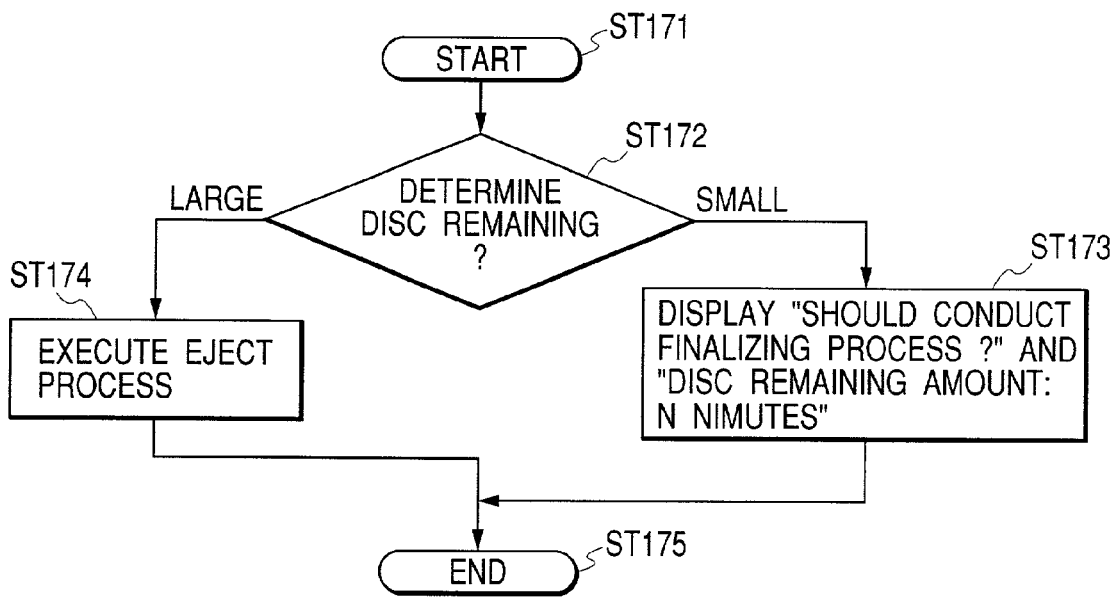
FIG. 13 shows other operation flowchart in the main portion in the embodiment according to the present invention.

This display is effective, in particular, in the condition when the remaining capacity is small on the disc 32, and is constructed so that: the remaining capacity is determined on the disc 32 in the step 172 shown in FIG. 13; ejecting process operation is executed in the step 174 if the remaining capacity is equal or greater than the predetermined value; and if the remaining capacity is less than the predetermined value, prompting the user to execute the finalizing process is made by displaying such that shown in FIG. 11. Herein, the remaining capacity on the disc 32 is determined by the control micro-computer 16, by absorbing or taking into the information of remaining amount in the recording capacity on the disc 32 from the control micro-computer 28 of the recording/reproducing portion 41 through the interface circuit 19 and the signal/control processing circuit 24.

Also, it may be constructed so that, not only upon the opportunity of taking out the disc 32, but also when a pause (i.e., a temporary stop of picture recording) is made from the operation switch 18 during when the camera takes picture on the apparatus, a prompting is made on execution of the finalizing process by displaying that shown in the FIG. 11, if the remaining capacity is less than the predetermined value.

Figure 12:
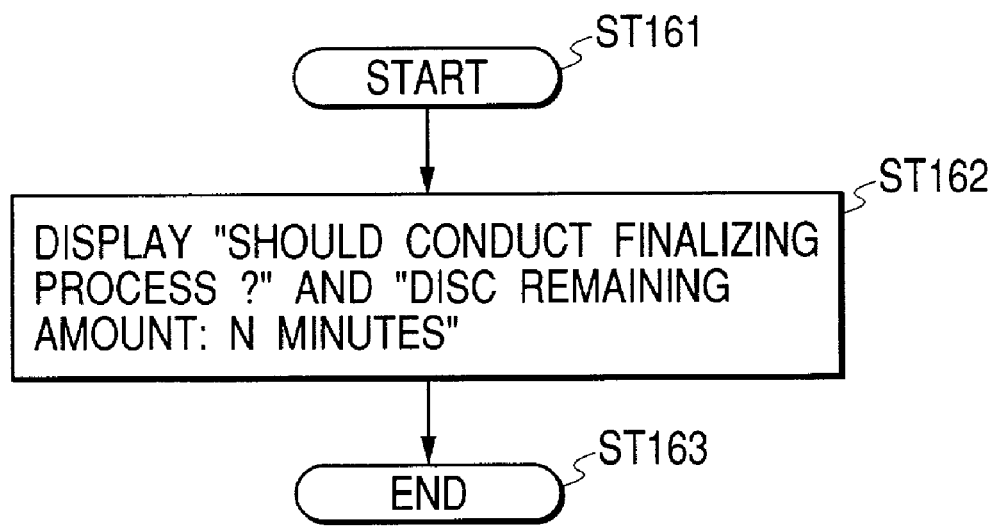
FIG. 12 shows the operation flowchart in other main portion in the embodiment according to the present invention.

Further, it may be constructed so that, that prompting is made on execution of the finalizing process by showing that shown in the FIG. 11, in the similar manner shown in FIG. 12, also when no capacity remains on the disc 32 during the recording of picture.

Figure 14:
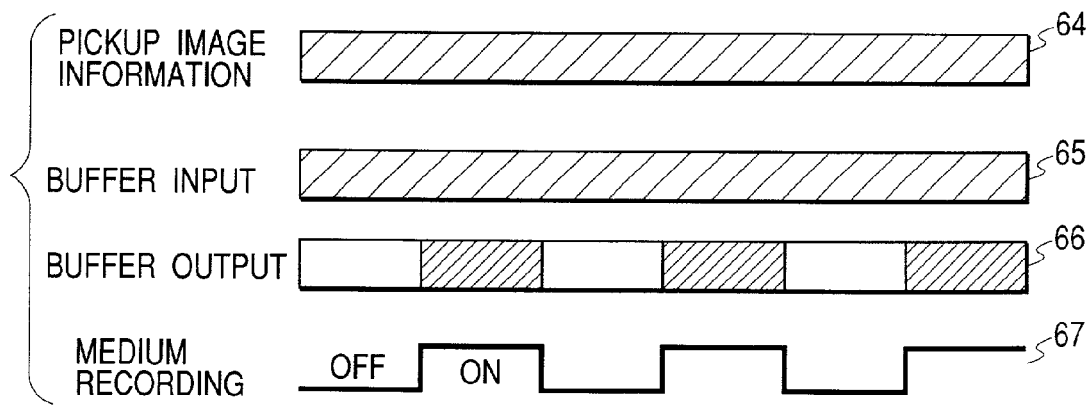
FIG. 14 is a view of showing typical waveforms, for the purpose of explanation on the operation of the main portion, in the embodiment according to the present invention.
Figure 15:
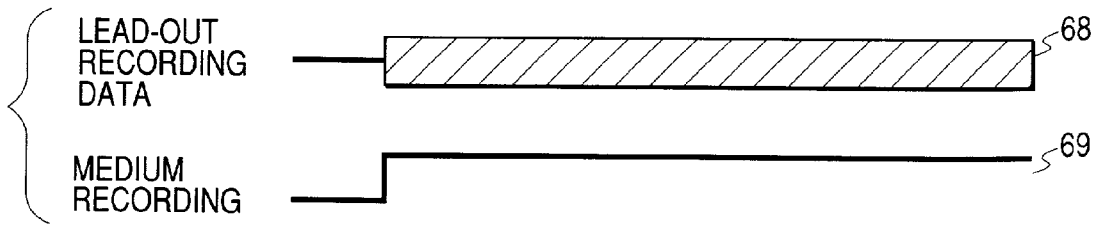
FIG. 15 is a view of showing typical waveforms, for the purpose of explanation on other operation of the main portion, in the embodiment according to the present invention.

Next, explanation will be made on an example relating to shortening of time of the finalizing process, by referring to the FIG. 1, and FIGS. 14 and 15, as well. During the recording of picture through the camera, ordinarily as shown in FIG. 14, the signals picked up through the camera portion 38 are inputted to the output portion 39, in which the video/audio signals thereof are compressed into the form of image pickup information 64, so as to be supplied to the buffer memory (i.e., the D-RAM 15) within the controller portion 40 as a buffer input 65. On a while, the recording/reproducing portion 41 loading the disc 32 therein, ordinarily, drives the disc 32 at the high recording transfer rate, fully enough for the purpose of recording the real-time picture picked up through the camera portion 38. In particular, on a portable equipment, when such a condition occurs that recording cannot be done stably due to a large vibration, etc., it is necessary that the same information is recorded on the same place or different place on the disc 32, again. Therefore, by taking those aspects into the consideration, while maintaining the capacity of the buffer memory (i.e., the D-RAM 15) large enough, the recording transfer rate is preset to be higher than the rate of the image pickup information 64, to be such the input signal as was mentioned above. In FIG. 14 is shown an example, in which the rate is about two (2) times high. Thus, the buffer output 66 from the above buffer memory (i.e., the D-RAM 15) is read out intermittently at the data rate being about two (2) times high to that of the buffer input 65 mentioned above, thereby to be recorded on the disc 32. ON/OFF condition of the medium recording 67 is that, as is shown in FIG. 14, only about a half (½) period in the recording condition.

On the other hand, upon recording on the disc 32 in the finalizing process, differing from the recording through the camera mentioned above, there is no necessity of the real-time recording. Also, this process is preferable to be completed in a short time, from a viewpoint on operability and also from a viewpoint of consumption of electric power. Then, as is shown in FIG. 15, the lead-out recording data 68, which is generated in the signal/control processing circuit 24, etc., is recorded on the disc 32, continuously (i.e., "ON" condition), as is shown by medium recording 69, so as to bring the averaged recording transfer rate to be high comparing to that when recording through the camera, thereby shortening the time necessary for the finalizing process. Herein, only the recording data in the lead-out area is mentioned, but other recording management data and the data in the lead-in area are also same to the above.

Also, in the explanation in the above, although the maximum recording transfer rates are explained to be the same, however, of course, it is possible to make the maximum recording transfer rate further fast by rising up the rotation speed of the disc 32 during the finalizing process, thereby obtaining shortened processing time and also reduction in the electric power consumption.

Figure 16:
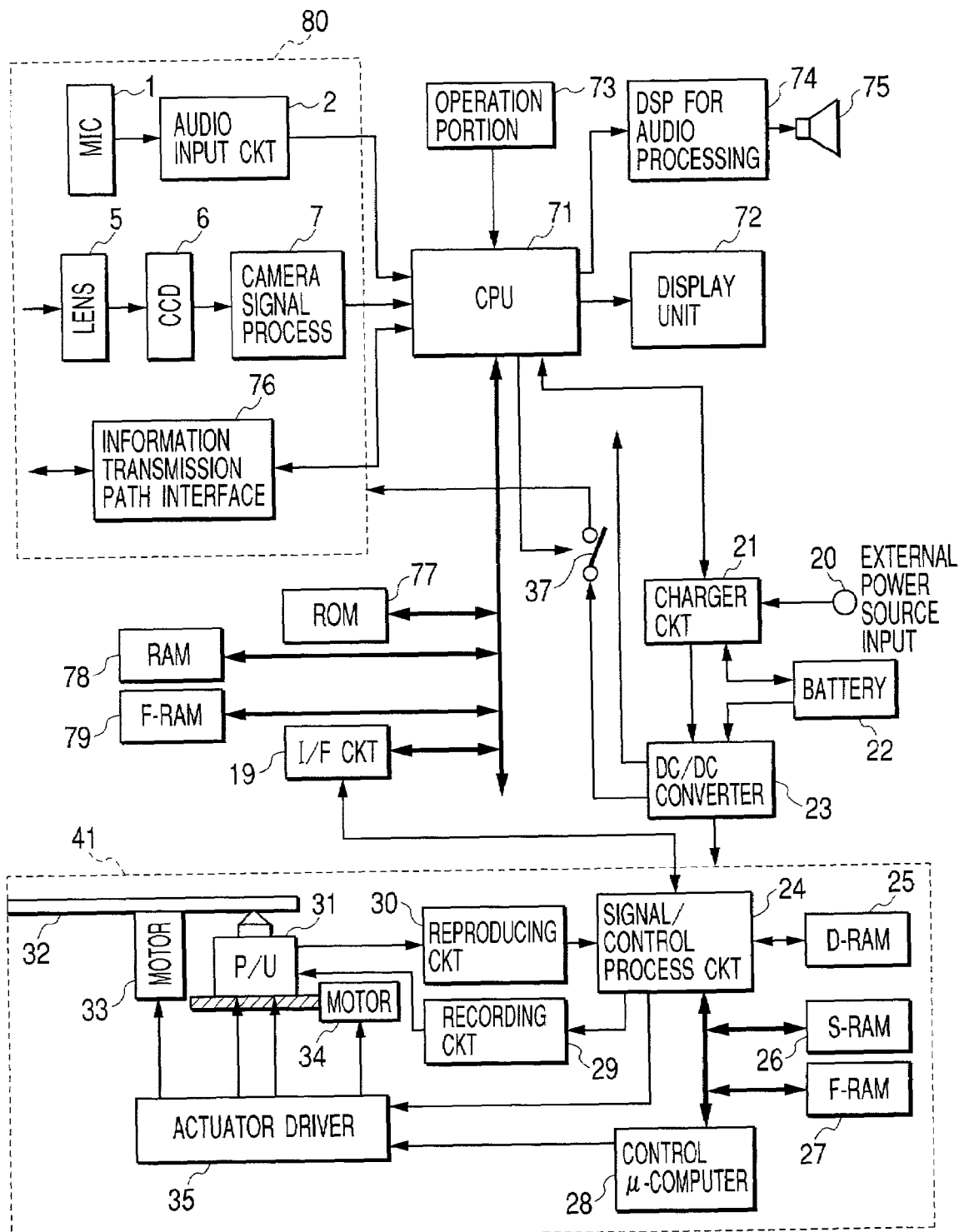
FIG. 16 shows a circuit block diagram of a second embodiment according to the present invention.

Next, explanation will be given further other embodiment according to the present invention, by referring to FIG. 16. In the figure, the same reference numerals are given to the same or similar elements or portions having the same functions, which are shown in the FIG. 1. Further, a reference numeral 71 indicates a CPU; 72 a display unit; 73 an operation portion; 74 a DSP for use of audio processing; 75 a speaker; 76 an information transmission path interface; 77 a ROM; 78 a RAM; 79 a flash memory (F-RAM); and 80 an input/output portion, respectively.

The present apparatus shown herein is a portable-type information processing apparatus, having the recording/reproducing portion 41 therein. In the case where a removable recording medium, such as, the disc 32, is applied to the recording/reproducing portion 41 of the portable-type information processing apparatus, and the apparatus has the input/output portion 80 that necessitates the real-time recording, in the similar manner as in the recording apparatus integrated with a camera in one body, there can be considered a possibility that the signal or information, being once recorded in real-time in the easy format, thereafter, is executed by the finalizing process thereupon, and is compiled into a compatible format, which can be reproduced by other reproducing apparatus (i.e., a viewer apparatus). In such the operation, the same problems to be solved and means for dissolving thereof, being same to those in the recording apparatus integrated with a camera, are still effective.

The input/output portion 80 in the same figure takes in the audio signals through the microphone 1 and the audio input processing circuit 2, while the video signals through the lens unit 5, the image pickup sensor (i.e., the CCD) and the camera video signal processing circuit 7. Also, through the information transmission path interface 76, it inputs and outputs the multi-media information, including, such as the video, audio and data, etc., between external equipments and/or between the network. The information, being taken into from the input/output portion 80, is processed within the CPU 71, and are memorized in the buffer memory (i.e., the RAM 78) contemporarily. When the information reaches to a predetermined amount, it is recoded into the recording/reproducing portion 41 through the interface circuit 19. Also, the user operates the operation portion 73, so as to control the operations of the apparatus. And, also the condition of the apparatus is disclosed or displayed to the user on the display unit 72. Operations of the other portions are basically same to those in the apparatus shown in the FIG. 1. Thus, to the present apparatus, the operations shown in the FIG. 2 to 15 is also applicable.

While we have shown and described several embodiments in accordance with our invention, it should be understood that the disclosed embodiments are susceptible of changes and modifications without departing from the scope of the invention. Therefore, we do not intend to be bound by the details shown and described herein but intend to cover all such changes and modifications falling within the ambit of the appended claims.

What is claimed is:

1. An optical information recording apparatus, comprising:
a first portable electric power source;
a first detector circuit for detecting remaining capacity of said first electric power source;
an external power source terminal of a second electric power source, being connected to an outside;
a second detector circuit for detecting that the second electric power source is supplied to said external power source terminal;
a recording circuit for recording information on a removable optical recording medium;
a finalizing process circuit for executing a finalizing process for said optical recording medium, the finalizing process making the optical recording medium to be compatible with a read-only disc, wherein the finalizing process circuit is configured to execute the finalizing process for a predetermined time period; and
a display for providing a first indication of the predetermined time period, wherein the first indication is provided on the display before the finalizing process is initiated,
wherein when either one of the remaining capacity of said first electric power source or voltage of said second electric power source is detected to be equal to or higher than a predetermined value, in said first detector circuit and said second detector circuit, the finalizing process is initiated by said finalizing process circuit upon said optical recording medium.

2. An information recording apparatus as described in claim 1, wherein the display provides a second indication of the remaining capacity of said first electric power source, the second indication being provided on the display before the finalizing process is initiated.

3. An information recording apparatus as described in claim 1, wherein the display provides a third indication of an amount of recordable space available on the optical recording medium, the third indication being provided on the display before the finalizing process is initiated.

4. An information recording apparatus as described in claim 2, wherein the display provides a third indication of an amount of recordable space available on the optical recording medium, the third indication being provided on the display before the finalizing process is initiated.

5. An optical information recording apparatus, comprising:
a first portable electric power source;
a first detector circuit for detecting remaining capacity of said first electric power source;
an external power source terminal of a second electric power source, being connected to an outside;
a second detector circuit for detecting that the second electric power source is supplied to said external power source terminal;
a recording circuit for recording information on a removable optical recording medium;
a finalizing process circuit for executing a finalizing process for said recording optical medium, the finalizing process making the optical recording medium to be compatible with a read-only disc, wherein the finalizing process circuit is configured to execute the finalizing process for a predetermined time period; and
a display for providing a first indication of the predetermined time period, wherein the first indication is provided on the display before the finalizing process is initiated,
wherein during execution of the finalizing process by said finalizing process circuit, when both of the remaining capacity of said first electric power source and voltage of said second electric power source are detected to be equal to or lower than respective predetermined values thereof, in said first detector circuit and said second detector circuit, execution of the finalizing process by said finalizing process circuit is stopped upon said optical recording medium.

6. An information recording apparatus, as described in any one of the claims 1 or 5, wherein the information recording apparatus is a portable-type recording apparatus integrated with a camera in one body when said recording medium is a disc.

7. An information recording apparatus, as described in any one of the claims 1 or 5, wherein the information recording apparatus is a portable-type information processing apparatus when said recording medium is a disc.

8. An information recording apparatus as described in claim 5, wherein the display provides a third indication of an amount of recordable space available on the optical recording medium, the third indication being provided on the display before the finalizing process is initiated.

9. An information recording apparatus as described in claim 5, wherein the display provides a second indication of the remaining capacity of said first electric power source, the second indication being provided on the display before the finalizing process is initiated.

10. An information recording apparatus as described in claim 9, wherein the display provides a third indication of an amount of recordable space available on the optical recording medium, the third indication being provided on the display before the finalizing process is initiated.

11. An optical information recording method for finalizing process data of a recording medium, the method comprising:
detecting remaining capacity in a first portable electric power source;
detecting voltage of a second electric power source which is supplied at an external power source terminal;
displaying a first indication of a predetermined time period required to complete execution of a finalizing process on an optical recording medium, the finalizing process making the optical recording medium to be compatible with a read-only disc; and
executing said finalizing process upon said optical recording medium when at least either one of the remaining capacity of said first electric power source or the voltage of said second electric power source is equal to or greater than a predetermined value.

12. An optical information recording method as described in claim 11, further comprising displaying a second indication of the remaining capacity in said first electric power source.

13. An optical information recording method as described in claim 12, further comprising displaying a third indication of an amount of recordable space available on the optical recording medium.

14. An optical information recording method as described in claim 11, further comprising displaying a third indication of an amount of recordable space available on the optical recording medium.

15. An optical information recording method of video data, the method comprising:

detecting remaining capacity in a first portable electric power source;

detecting voltage of a second electric power source which is supplied at an external power source terminal;

recording information on a removable optical recording medium;

displaying a first indication of a predetermined time period required to complete execution of a finalizing process on said optical recording medium, the finalizing process making the optical recording medium to be compatible with a read-only disc;

executing said finalizing process upon said optical recording medium; and stopping execution of said finalizing process when both the remaining capacity of said first electric power source and the voltage of said second electric power source are equal to or less than respective predetermined values thereof, during the finalizing process.

16. An optical information recording method as described in claim 15, further comprising displaying a second indication of the remaining capacity in said first electric power source.

17. An optical information recording method as described in claim 16, further comprising displaying a third indication of an amount of recordable space available on the optical recording medium.

18. An optical information recording method as described in claim 15, further comprising displaying a third indication of an amount of recordable space available on the optical recording medium.

19. An optical information recording apparatus, comprising:

a first portable electric power source;

a first detector circuit for detecting remaining capacity of said first electric power source;

an external power source terminal of a second electric power source, being connected to an outside;

a second detector circuit for detecting that the second electric power source is supplied to said external power source terminal;

a recording circuit for recording information on a removable optical recording medium;

a finalizing process circuit for executing a finalizing process for said optical recording medium, the finalizing process making the optical recording medium to be compatible with a read-only disc; and a display for providing a first indication of the remaining capacity of said first electric power source, the first indication being provided on the display before the finalizing process is initiated, wherein when either one of the remaining capacity of said first electric power source or voltage of said second electric power source is detected to be equal to or higher than a predetermined value, in said first detector circuit and said second detector circuit, the finalizing process is initiated by said finalizing process circuit upon said optical recording medium.

20. An information recording apparatus as described in claim 19, wherein the display provides a second indication of an amount of recordable space available on the optical recording medium, the second indication being provided on the display before the finalizing process is initiated.

21. An information recording apparatus as described in claim 19, wherein the information recording apparatus is a portable-type recording apparatus integrated with a camera in one body when said recording medium is a disc.

22. An information recording apparatus as described in claim 19, wherein the information recording apparatus is a portable-type information processing apparatus when said recording medium is a disc.

23. An optical information recording apparatus, comprising:

a first portable electric power source;

a first detector circuit for detecting remaining capacity of said first electric power source;

an external power source terminal of a second electric power source, being connected to an outside;

a second detector circuit for detecting that the second electric power source is supplied to said external power source terminal;

a recording circuit for recording information on a removable optical recording medium;

a finalizing process circuit for executing a finalizing process for said recording optical medium, the finalizing process making the optical recording medium to be compatible with a read-only disc; and a display for providing a first indication of the remaining capacity of said first electric power source, the first indication being provided on the display before the finalizing process is initiated, wherein during execution of the finalizing process by said finalizing process circuit, when both of the remaining capacity of said first electric power source and voltage of said second electric power source are detected to be equal to or lower than respective predetermined values thereof, in said first detector circuit and said second detector circuit, execution of the finalizing process by said finalizing process circuit is stopped upon said optical recording medium.

24. An information recording apparatus as described in claim 23, wherein the display provides a second indication of an amount of recordable space available on the optical recording medium, the second indication being provided on the display before the finalizing process is initiated.

25. An information recording apparatus as described in claim 23, wherein the information recording apparatus is a portable-type recording apparatus integrated with a camera in one body when said recording medium is a disc.

26. An information recording apparatus as described in claim 23, wherein the information recording apparatus is a portable-type information processing apparatus when said recording medium is a disc.

27. An optical information recording method for finalizing process data of a recording medium, the method comprising:

detecting remaining capacity in a first portable electric power source;

detecting voltage of a second electric power source which is supplied at an external power source terminal;

displaying a first indication of the remaining capacity of said first electric power source; and executing a finalizing process on an optical recording medium, the finalizing process making the optical recording medium to be compatible with a read-only disc, wherein the finalizing process is executed in the event that at least either one of the remaining capacity of said first electric power source or the voltage of said second electric power source is equal to or greater than a predetermined value.

28. An optical information recording method as described in claim 27, further comprising displaying a second indication of an amount of recordable space available on the optical recording medium.

29. An optical information recording method of video data, the method comprising:
- detecting remaining capacity in a first portable electric power source;
- detecting voltage of a second electric power source which is supplied at an external power source terminal;
- recording information on a removable optical recording medium;
- displaying a first indication of the remaining capacity of said first electric power source;
- executing a finalizing process on said optical recording medium, the finalizing process making the optical recording medium to be compatible with a read-only disc; and
- stopping execution of said finalizing process when both the remaining capacity of said first electric power source and the voltage of said second electric power source are equal to or less than respective predetermined values thereof, during the finalizing process.

30. An optical information recording method as described in claim 29, further comprising displaying a second indication of an amount of recordable space available on the optical recording medium.

31. An optical information recording apparatus, comprising:
- a first portable electric power source;
- a first detector circuit for detecting remaining capacity of said first electric power source;
- an external power source terminal of a second electric power source, being connected to an outside;
- a second detector circuit for detecting that the second electric power source is supplied to said external power source terminal;
- a recording circuit for recording information on a removable optical recording medium;
- a finalizing process circuit for executing a finalizing process for said optical recording medium, the finalizing process making the optical recording medium to be compatible with a read-only disc; and
- a display for providing an indication of an amount of recordable space available on the optical recording medium, the indication being provided on the display before the finalizing process is initiated,
- wherein when either one of the remaining capacity of said first electric power source or voltage of said second electric power source is detected to be equal to or higher than a predetermined value, in said first detector circuit and said second detector circuit, the finalizing process is initiated by said finalizing process circuit upon said optical recording medium.

32. An information recording apparatus as described in claim 31, wherein the information recording apparatus is a portable-type recording apparatus integrated with a camera in one body when said recording medium is a disc.

33. An information recording apparatus as described in claim 31, wherein the information recording apparatus is a portable-type information processing apparatus when said recording medium is a disc.

34. An optical information recording apparatus, comprising:
- a first portable electric power source;
- a first detector circuit for detecting remaining capacity of said first electric power source;
- an external power source terminal of a second electric power source, being connected to an outside;
- a second detector circuit for detecting that the second electric power source is supplied to said external power source terminal;
- a recording circuit for recording information on a removable optical recording medium;
- a finalizing process circuit for executing a finalizing process for said recording optical medium, the finalizing process making the optical recording medium to be compatible with a read-only disc; and
- a display for providing an indication of an amount of recordable space available on the optical recording medium, the indication being provided on the display before the finalizing process is initiated,
- wherein during execution of the finalizing process by said finalizing process circuit, when both of the remaining capacity of said first electric power source and voltage of said second electric power source are detected to be equal to or lower than respective predetermined values thereof, in said first detector circuit and said second detector circuit, execution of the finalizing process by said finalizing process circuit is stopped upon said optical recording medium.

35. An information recording apparatus as described in claim 34, wherein the information recording apparatus is a portable-type recording apparatus integrated with a camera in one body when said recording medium is a disc.

36. An information recording apparatus as described in claim 34, wherein the information recording apparatus is a portable-type information processing apparatus when said recording medium is a disc.

37. An optical information recording method for finalizing process data of a recording medium, the method comprising:
- detecting remaining capacity in a first portable electric power source;
- detecting voltage of a second electric power source which is supplied at an external power source terminal;
- displaying an indication of an amount of recordable space available on the optical recording medium; and
- executing a finalizing process on an optical recording medium, the finalizing process making the optical recording medium to be compatible with a read-only disc, wherein the finalizing process is executed in the event that at least either one of the remaining capacity of said first electric power source or the voltage of said second electric power source is equal to or greater than a predetermined value.

38. An optical information recording method of video data, the method comprising:
- detecting remaining capacity in a first portable electric power source;
- detecting voltage of a second electric power source which is supplied at an external power source terminal;
- recording information on a removable optical recording medium;
- displaying an indication of an amount of recordable space available on the optical recording medium;
- executing a finalizing process on said optical recording medium, the finalizing process making the optical recording medium to be compatible with a read-only disc; and
- stopping execution of said finalizing process when both the remaining capacity of said first electric power source and the voltage of said second electric power source are equal to or less than respective predetermined values thereof, during the finalizing process.

* * * * *